US011589122B2

(12) United States Patent
Ellis et al.

(10) Patent No.: US 11,589,122 B2
(45) Date of Patent: Feb. 21, 2023

(54) SYSTEM AND METHOD FOR PROVIDING A LIST OF VIDEO-ON-DEMAND PROGRAMS

(71) Applicant: Rovi Guides, Inc., San Jose, CA (US)

(72) Inventors: Michael D. Ellis, Boulder, CO (US); Robert A. Knee, Lansdale, PA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/350,406

(22) Filed: Jun. 17, 2021

(65) Prior Publication Data

US 2021/0385542 A1 Dec. 9, 2021

Related U.S. Application Data

(60) Continuation of application No. 15/977,250, filed on May 11, 2018, now Pat. No. 11,070,883, which is a continuation of application No. 12/827,186, filed on Jun. 30, 2010, now Pat. No. 9,973,817, which is a division of application No. 11/102,873, filed on Apr. 8, 2005, now abandoned.

(51) Int. Cl.
| H04N 21/472 | (2011.01) |
| H04N 21/45 | (2011.01) |
| H04N 21/482 | (2011.01) |
| H04N 21/431 | (2011.01) |
| H04N 21/442 | (2011.01) |
| H04N 21/475 | (2011.01) |

(52) U.S. Cl.
CPC ....... *H04N 21/472* (2013.01); *H04N 21/4312* (2013.01); *H04N 21/44204* (2013.01); *H04N 21/44213* (2013.01); *H04N 21/44222* (2013.01); *H04N 21/4532* (2013.01); *H04N 21/47202* (2013.01); *H04N 21/482* (2013.01); *H04N 21/4755* (2013.01); *H04N 21/4821* (2013.01)

(58) Field of Classification Search
CPC ............. H04N 21/472; H04N 21/4312; H04N 21/44204; H04N 21/44213; H04N 21/44222; H04N 21/4532; H04N 21/47202; H04N 21/482; H04N 21/4755; H04N 21/4821
See application file for complete search history.

(56) References Cited

U.S. PATENT DOCUMENTS

2002/0011988 A1* 1/2002 Sai ...................... H04N 21/482
345/156
2003/0190150 A1* 10/2003 Kawasaki .......... H04N 21/4316
386/243

* cited by examiner

*Primary Examiner* — Alazar Tilahun
(74) *Attorney, Agent, or Firm* — Haley Guiliano LLP

(57) ABSTRACT

A list of video-on-demand (VOD) programs based on viewer selections is provided. VOD programs may be marked with a mark indicating the level of viewer interest. In one embodiment, a list of VOD programs may be displayed that includes or excludes programs having a particular mark, or sorts programs based on the marks. In another embodiment, a list of VOD programs may be displayed based on availability times. In yet another embodiment, after a viewer has played back a VOD program, a list of related VOD programs may be automatically displayed.

20 Claims, 15 Drawing Sheets

SYSTEM AND METHOD FOR PROVIDING A LIST OF VIDEO-ON-DEMAND PROGRAMS

CROSS REFERENCE TO RELATED APPLICATIONS

This application is a continuation of U.S. patent application Ser. No. 15/977,250, filed May 11, 2018, which is a continuation of U.S. patent application Ser. No. 12/827,186 (now U.S. Pat. No. 9,973,817), filed Jun. 30, 2010, which is a division of U.S. patent application Ser. No. 11/102,873, filed Apr. 8, 2005, abandoned, which are hereby incorporated by reference herein in their entireties.

BACKGROUND OF THE INVENTION

This invention relates to video-on-demand (VOD) programs. More particularly, this invention relates to providing a list of VOD programs based on viewer selections.

Cable, satellite, and broadcast television systems provide viewers with a large number of television channels. Interactive television program guides have been developed that allow television program information to be displayed on a viewer's television. Interactive television program guides allow the viewer to navigate through television program listings using a remote control. Listings are typically displayed in a list or grid.

Various groups of television program listings are typically displayed in predefined or user-defined categories. A viewer can select to view the television program listings by air time, channel, or category (e.g., movies, sports, children). The viewer can also set up a preference profile by defining preference levels indicating the viewer's interest or disinterest for a particular series, genre, channel, actor or actress, and rating. The television program listings can then be displayed based on the preference profile. The viewer can further be provided an opportunity to indicate an interest in a television program and request that the system locate other related television programs.

Video-on-demand (VOD) systems have been developed that allow a viewer to request the playback of a VOD program for immediate viewing or for later playback. The list of all available VOD programs are typically displayed on the viewer's television in a predefined way. Present VOD systems limit the ability of the viewer to customize the display of VOD program listings.

In view of the foregoing, it would be desirable to provide a list of VOD programs based on viewer selections.

SUMMARY OF THE INVENTION

It is an object of this invention to provide a list of video-on-demand (VOD) programs based on viewer selections.

In accordance with this invention, VOD programs may be marked with a mark indicating the level of viewer interest. A VOD system may automatically mark a VOD program with a mark indicating that the program is "already viewed" or "partially viewed." A viewer may also mark a VOD program with a mark indicating that the program is "of interest" or of "no interest." The marks may be represented by an icon, text, color, or other suitable formatting.

In one embodiment, a list of VOD programs may be displayed to the viewer based on the marks. For example, the viewer may select to view a list of VOD programs that includes only programs marked as "of interest." The viewer may also select to view a list of VOD programs that excludes programs marked as "already viewed" or of "no interest" (e.g., the list includes programs marked as "of interest," programs marked as "partially viewed," and unmarked programs). Alternatively, the viewer may select to view a list of VOD programs that are sorted based on one or more marks. The list may be sorted such that all programs marked as "of interest" are listed first, followed by all programs marked as "partially viewed," followed by all unmarked programs, followed by all programs marked as "already viewed," and followed by all programs marked as of "no interest." Each of the programs having a particular mark or no mark may be listed in alphabetical order, by the time each program was made available from a VOD server, by the time remaining before each program will be removed from the VOD server, or any other suitable order or combination thereof.

In another embodiment, a list of VOD programs may be displayed to the viewer based on availability times. Programs that have been made available from the VOD server most recently may be listed first while programs that have been made available from the VOD server the longest may be listed last. Alternatively, programs that will be removed from the VOD server the soonest may be listed first while programs that will be removed from the VOD server the latest may be listed last.

In yet another embodiment, after a viewer has played back a VOD program, a list of related VOD programs may be automatically generated and displayed to the viewer. For example, a television series may have each episode as a separate VOD program. Also, a movie and its sequels and prequels may be separate VOD programs. The list of related VOD programs, which may include the already viewed program, may be listed in episode or movie order, in alphabetical order, based on the marks, based on availability times, or any other suitable order or combination thereof. The viewer may then have the opportunity to mark one or more of the related VOD programs with an "of interest" mark or a "no interest" mark. The viewer may also request the playback of one of the related VOD programs.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The invention provides a list of video-on-demand (VOD) programs based on viewer selections.

Figure 1:
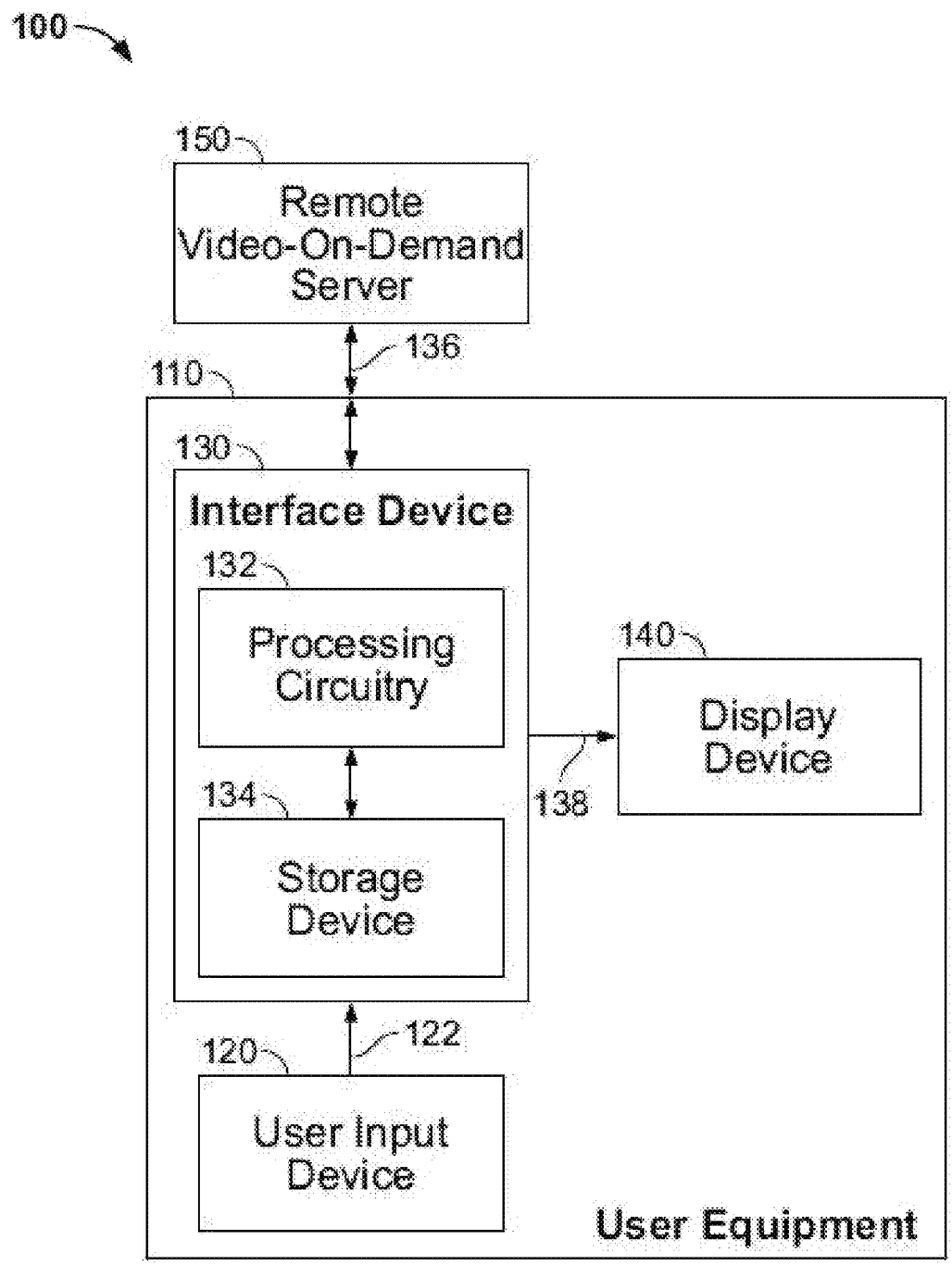
FIG. 1 is a block diagram of a video-on-demand (VOD) system in accordance with the invention.

FIG. 1 is a simplified block diagram of a video-on-demand (VOD) system 100. VOD system 100 includes user equipment 110 and a remote VOD server 150. User equipment 110 may be any suitable user equipment including, for example, television equipment or computer equipment. VOD programs may be distributed from a headend or remote site (not shown) to, and stored on, remote VOD server 150.

User equipment 110 includes a user input device 120, an interface device 130, and a display device 140. User input device 120 may be any suitable device or combination of devices including, for example, a remote control, keyboard, mouse, touch pad, touch screen, or voice recognition interface. Interface device 130 may be any suitable device including, for example, a television, a set-top box, a digital video recorder (DVR), and a personal video recorder (PVR). Display device 140 may be any suitable device including, for example, a television monitor and a computer monitor. Display device 140 may also be configured to provide for the output of audio.

Interface device 130 may receive signals from user input device 120 via communications path 122, may send signals to, and receive signals from, remote VOD server 150 via communications path 136, and may also send signals to display device 140 via communications path 138. Communications paths 122, 136, and 138 may be any suitable path for transferring data including, for example, a satellite path, a fiber-optic path, a cable path, an infrared path, or other wired or wireless path. Although communications path 136 is shown as a single path for clarity, communications path 136 may include more than one path.

Interface device 130 may include processing circuitry 132 for processing signals received from user input device 120, for sending the processed signals to remote VOD server 150 or a local storage device 134 in interface device 130, for processing data from remote VOD server 150 for output on display device 140 or for as storage on storage device 134, or for processing data from storage device 134 for output on display device 140. Processing circuitry may be any suitable processor such as a microprocessor and may include any other suitable circuitry including, for example, caching circuitry, video decoding circuitry, direct memory access circuitry, input-output circuitry, and recording circuitry. Storage device 134 may be any suitable device including, for example, a memory, random-access memory, flash memory, a hard disk drive, or any combination thereof.

A viewer can send a request for playback of a VOD program using user input device 120. User input device 120 sends a signal to processing circuitry 132 (in interface device 130), which then sends a signal to remote VOD server 150 requesting a video stream of the requested VOD program. Remote VOD server 150 sends the video stream to processing circuitry 132. In one embodiment, processing circuitry 132 may send the video stream directly to display device 140 for immediate playback. In another embodiment, processing circuitry 132 may store the video stream in storage device 134. Processing circuitry 132 may retrieve the video stream stored in storage device 134 for output to display device 140 for immediate playback or may be retrieved for later playback.

The viewer may also send a request for a list of VOD programs based on viewer selections using user input device 120. In one embodiment of the invention, processing circuitry 132 may retrieve a list of all available VOD programs (or a specified subset of all available VOD programs) from remote VOD server 150 and generate a new list of VOD programs based on viewer selections for output on display device 140. In another embodiment of the invention, processing circuitry 132 may retrieve-a list of VOD programs that have been recorded by interface device 130 and stored in storage device 134, and may generate a new list of recorded VOD programs based on viewer selections for output on display device 140.

In accordance with an embodiment of the invention, VOD programs may be marked with a mark indicating the level of viewer interest. A VOD system may automatically mark a VOD program with a mark indicating that the program is "already viewed" or "partially viewed." A viewer may also mark a VOD program with a mark indicating that the program is "of interest," of "no interest," or any other suitable level of interest. The marks may be represented by an icon, text, color, or other suitable formatting. The VOD program with the associated mark may be stored in storage device 134 in interface device 130 or in a remote storage at remote VOD server 150. Information about the associated mark may be stored with the VOD program or separately, and may be stored in storage device 134 in interface device 130 or in remote storage at remote VOD server 150.

Figure 2A:
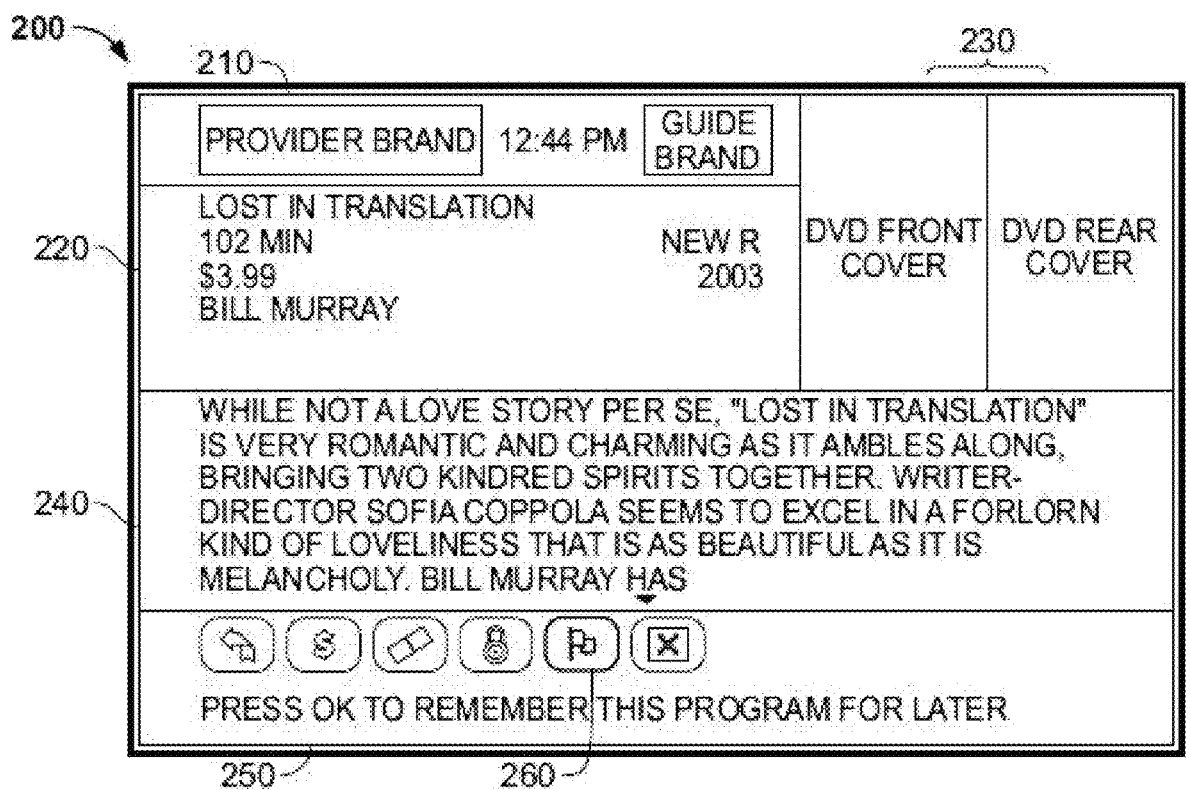
FIG. 2A is an illustrative display screen showing a VOD program being marked with an "of interest" mark in accordance with one embodiment of the invention.
Figure 2B:
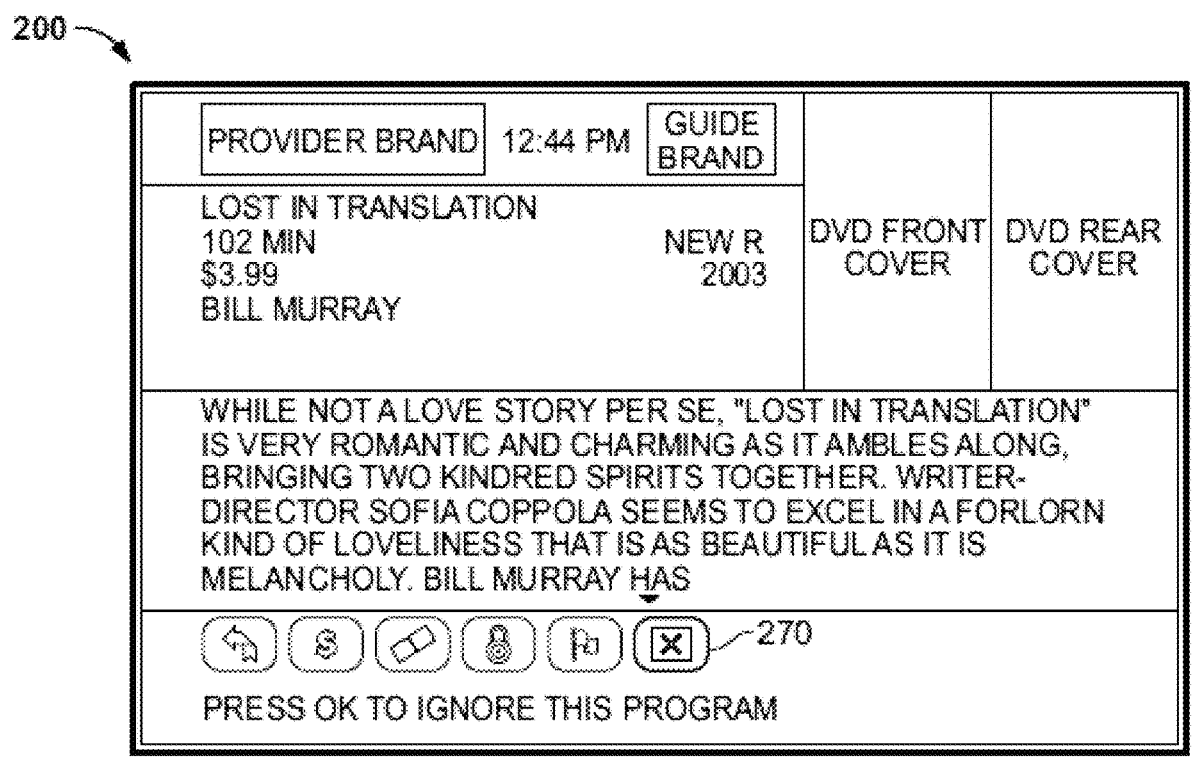
FIG. 2B is an illustrative display screen showing a VOD program being marked with a "no interest" mark in accordance with one embodiment of the invention.

FIGS. 2A-B show a display screen 200 of a VOD program listing. Screen 200 may be divided into more than one section (e.g., sections 210, 220, 230, 240, and 250). Section 210 may include a current time, a guide brand, and a provider brand. Section 220 may include a VOD program listing. The VOD program listing may include the program title, the duration of the program, the cost to order the program, the lead actor(s) and/or actress(es), the rating, the release year, or any other suitable information. Section 230 may include a picture associated with the VOD program (e.g., a video tape or DVD cover), a video window displaying a trailer for the VOD program, an advertisement, or any other suitable display. Section 240 may include a synopsis of the program or any other suitable information. Section 250 may include buttons from which a viewer can select. The buttons, when selected, may allow the viewer to return to a main menu, to purchase the program, to view a trailer of the program, to parentally lock the program, to mark the program as "of interest" (button 260), to mark the program as of "no interest" (button 270), or any other suitable action. When one of the buttons is highlighted, section 250 may display information about that button. For example, the phrase "Press OK to remember this program for later" may be displayed when button 260 is highlighted while the phrase "Press OK to ignore this program" may be displayed when button 270 is highlighted.

Figure 3:
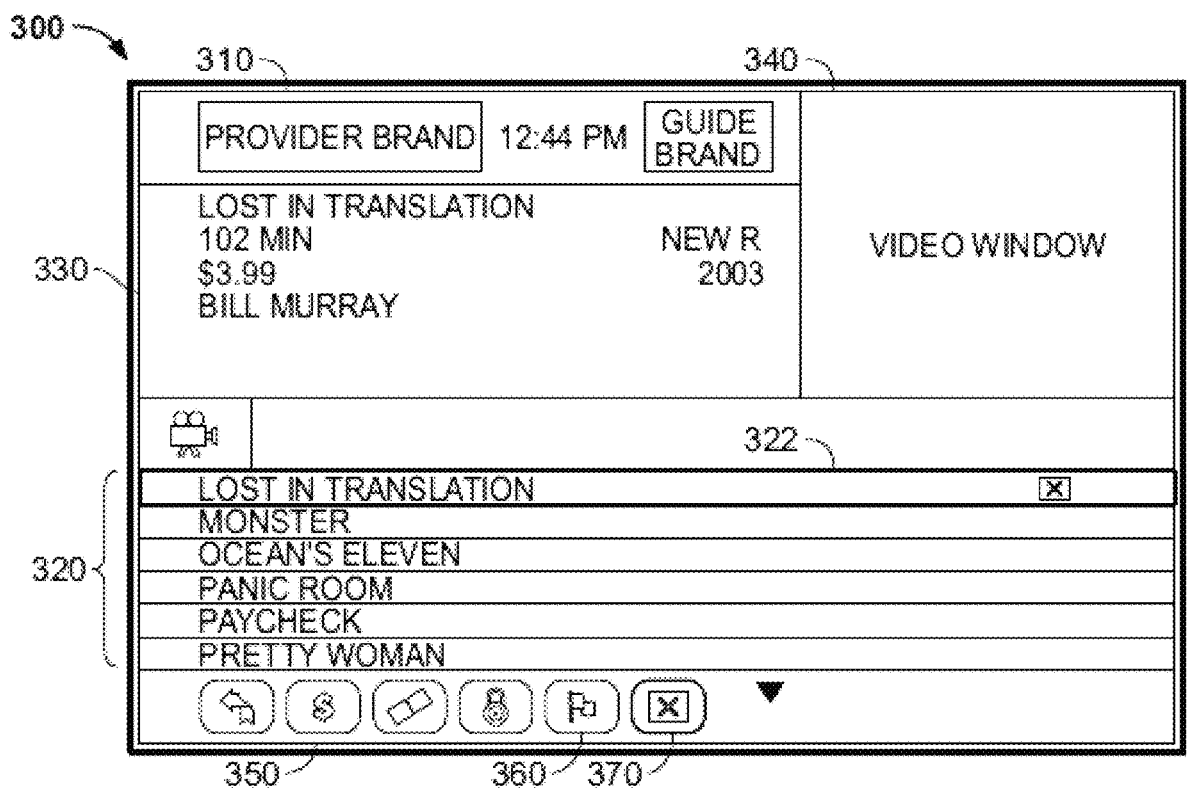
FIG. 3 is an illustrative display screen showing a VOD program being marked with a "no interest" mark in accordance with another embodiment of the invention.

FIG. 3 shows a display screen 300 of VOD program listings. Screen 300 may be divided into more than one section (e.g., sections 310, 320, 330, 340, and 350). Section 310 may include a current time, a guide brand, and a provider brand. Section 320 may include a listing of all VOD programs available from, or a selected subset of all VOD programs available from, remote VOD server 150. A viewer may scroll through the listings using user input device 120. Information about the highlighted program 322 may be displayed in section 330, which may include the program title, the duration of the program, the cost to order the program, the lead actor(s) and/or actress(es), the rating, the release year, or any other suitable information. Section 340 may be a video window showing a trailer for the highlighted program 322, a trailer associated with another VOD program, a television program, an advertisement, or any other suitable display. The viewer may then select from buttons in section 350 using user input device 120. The buttons, when selected, may allow the viewer to return to a main menu, to purchase the highlighted program, to view a trailer of the highlighted program, to parentally lock the highlighted program, to mark the highlighted program as "of interest" (button 360), to mark the highlighted program as of "no interest" (button 370), or any other suitable action. The user may also select one of the listed programs to see a more detailed information screen, such as the information screen shown in FIGS. 2A-B.

The display screens described in connection with FIGS. 2A-B and 3 are described herein primarily for clarity. Other suitable display screens may also be used in which a viewer may be provided the opportunity to mark VOD programs. While the marks shown in FIGS. 2A-B and 3 are represented with a flag icon (to represent an "of interest" mark) and an "X" icon (to represent a "no interest" mark) for clarity, other suitable icons, text, color, or other suitable formatting may be used.

In one embodiment of the invention, a list of VOD programs may be displayed to the viewer based on the marks. The viewer may select to view all VOD programs, movies, television shows, or programs in any other suitable category or combination of categories. The viewer may also select to include or exclude certain programs having a particular mark. For example, the viewer may select to view a list of VOD programs that includes only programs marked as "of interest," or a list of VOD programs that includes only programs marked as "partially viewed." The viewer may also select to view a list of VOD programs that includes only programs marked as "of interest" or as "partially viewed." The list may be displayed such that all programs marked as "of interest" are listed first followed by all programs marked as "partially viewed," or all programs marked as "partially viewed" are listed first followed by all programs marked as "of interest," or the programs may be intermixed in any suitable order. The viewer may also select to view a list of VOD programs that excludes programs marked as "already viewed" or of "no interest" (e.g., the list includes programs marked as "of interest," programs marked as "partially viewed," and unmarked programs).

The viewer may further select to view a list of VOD programs (e.g., all VOD programs, all VOD programs in a particular category or combination of categories) that is sorted based on the mark. The list may be sorted such that all programs marked as "of interest" are listed first, followed by all programs marked as "partially viewed," followed by all unmarked programs, followed by all programs marked as "already viewed," and followed by all programs marked as of "no interest." Any other suitable sorting order may be used. Each of the programs having a particular mark or no mark may be listed in any suitable order including, for example, in alphabetical order, by the time each program was made available from remote VOD server 150, by the time remaining before each program will be removed from remote VOD server 150, or any other suitable order or combination thereof.

Figure 4:
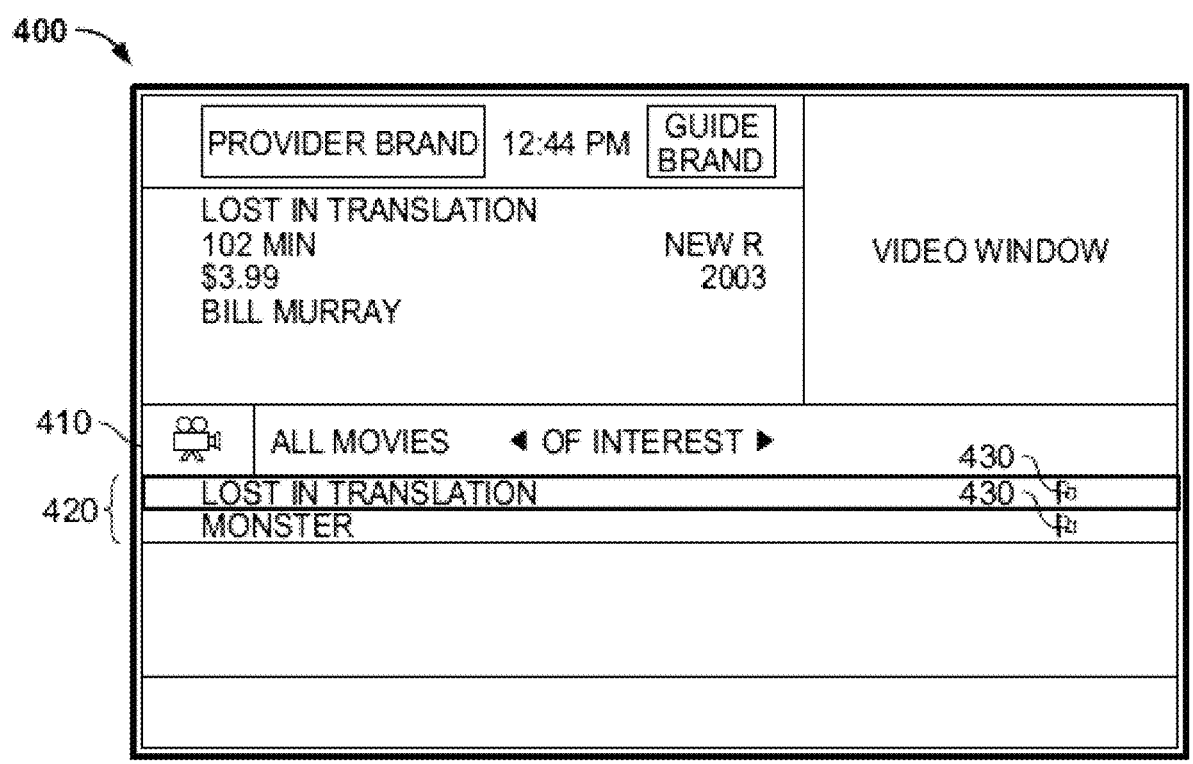
FIG. 4 is an illustrative display screen showing VOD program listings that include programs having an "of interest" mark in accordance with one embodiment of the invention.

FIG. 4 shows a display screen 400 of a list of VOD programs that includes programs having a particular mark. Screen 400 includes a section 410 that allows a viewer to select the type of VOD programs to include in the list. The viewer can scroll through the selections (as shown), can pull up a menu that allows the viewer to make selections, or any other suitable approach. As shown in section 410, the viewer has selected to view a list of all movies having an "of interest" mark 430. The list showing each such movie title and the associated mark is displayed in section 420.

Figure 5:
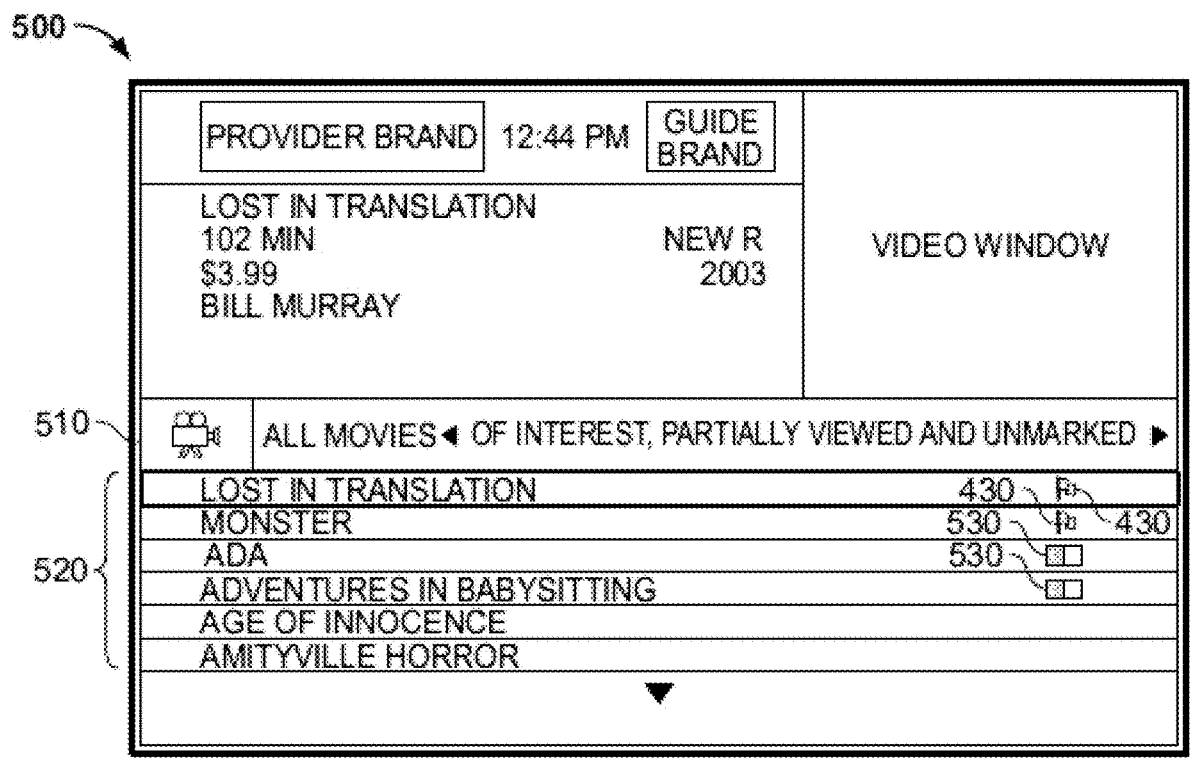
FIG. 5 is an illustrative display screen showing VOD program listings that exclude programs having an "already viewed" mark or a "no interest" mark in accordance with one embodiment of the invention.

FIG. 5 shows a display screen 500 of a list of VOD programs that excludes programs having a particular mark. Screen 500 includes a section 510 that allows the viewer to select the types of VOD programs to exclude from the list. As shown in section 510, the viewer has selected to view a list that excludes all movies having an "already viewed" mark or a "no interest" mark (e.g., includes all movies having an "of interest" mark 430, all movies having a "partially viewed" mark 530, and unmarked movies). The list is displayed in section 520.

Figure 6A:
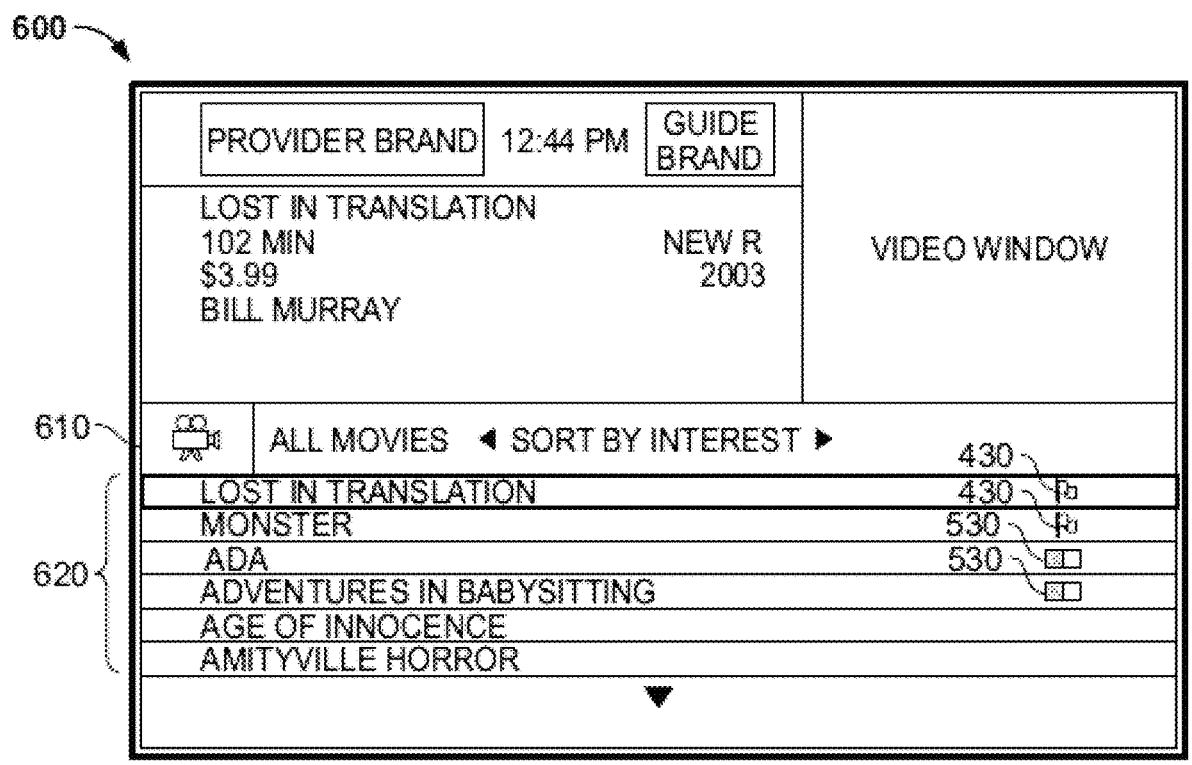
FIGS. 6A-B are illustrative display screens showing VOD program listings sorted based on mark in accordance with one embodiment of the invention.
Figure 6B:
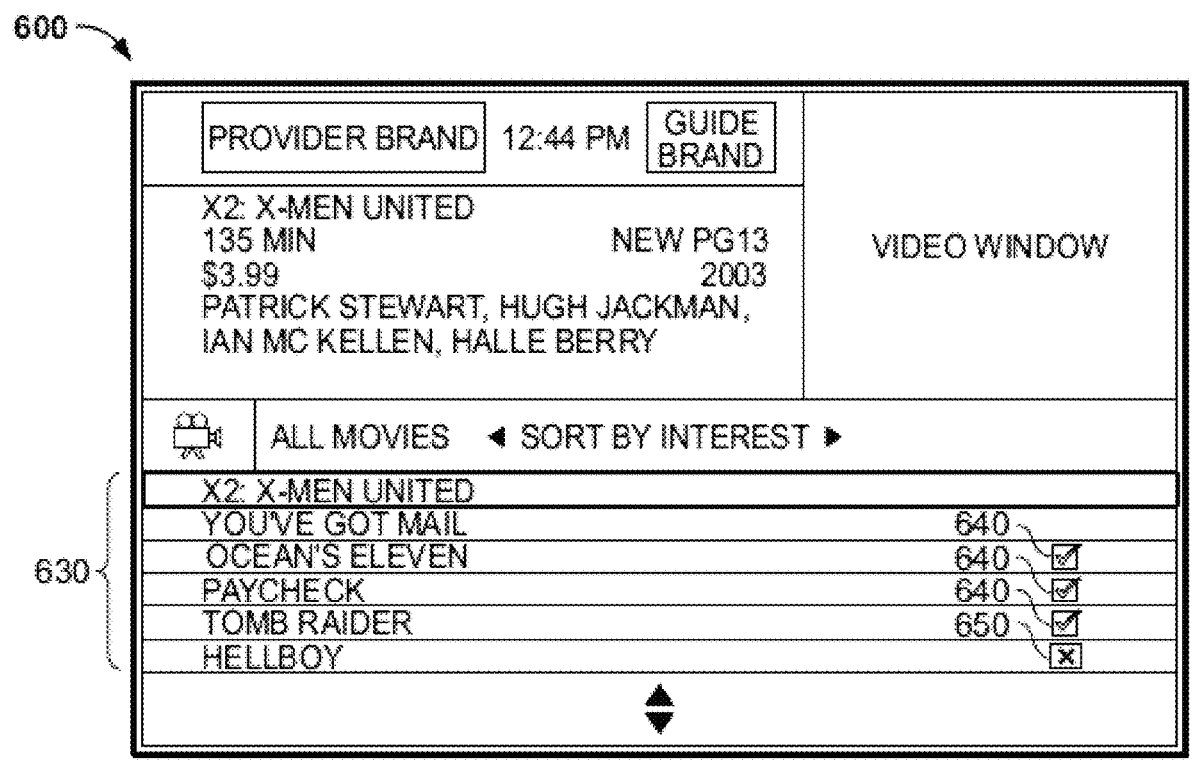

FIGS. 6A-B show a display screen 600 of a list of VOD programs sorted based on mark. Screen 600 includes a section 610 that allows the viewer to select how they want to sort the list of VOD programs. As shown in section 610, the viewer has selected to sort all movies by interest. The list of programs sorted by interest are displayed in sections 620 and 630. The viewer may scroll down through the list to view all as programs in the list. The programs marked as "of interest" 430 are displayed at the beginning of the list, followed by programs marked as "partially viewed" 530, followed by unmarked programs, followed by programs marked as "already viewed" 640, and then followed by programs marked as of "no interest" 650. Any other suitable sorting order for the different types of marks or for a subset of the marks may be used. Although the programs are listed in alphabetical order for a particular mark, the programs may be listed in any other suitable order.

In another embodiment of the invention, a list of VOD programs may be displayed to the viewer based on availability times. The viewer may select to sort all VOD programs, all movies, all television shows, or all programs in any other suitable category or combination of categories. One approach may be based on how long each program has been made available from remote VOD server 150. Programs that have been made available most recently may be listed first while programs that have been made available the longest may be listed last. Alternatively, programs that have been made available the longest may be listed first while programs that have been made available most recently may be listed last. Another approach may be based on how much longer each program will remain available on remote VOD server 150 before being removed. Programs that will be removed the soonest may be listed first while programs that will be removed the latest may be listed last. Alternatively, programs that will be removed the latest may be listed first while programs that will be removed the soonest may be listed last.

Figure 7:
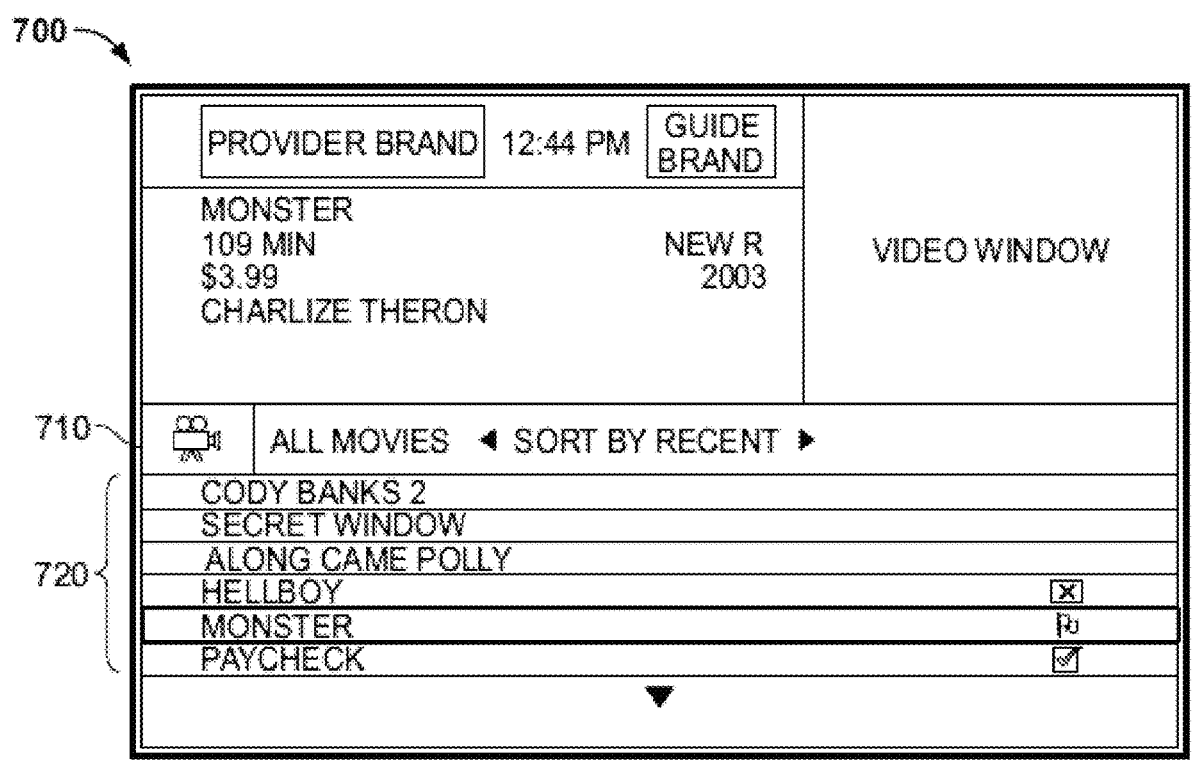
FIG. 7 is an illustrative display screen showing VOD program listings sorted based on how long each of the VOD programs has been available from the VOD server in accordance with one embodiment of the invention.

FIG. 7 shows a display screen 700 of a list of VOD programs that is sorted based on availability times. Screen 700 includes a section 710 that allows the viewer to select how they want to sort the list of VOD programs. As shown in section 710, the viewer has selected to sort all movies based on how recently the programs have been made available from remote VOD server 150. For example, movies that have been made available most recently are listed first while movies that have been made available the longest are listed last. The list is displayed in section 720. Although not shown, section 720 can also include, alongside each movie title and associated mark, any other suitable information including how long the movie has been made available or how much longer the movie will be made available.

Figure 8:
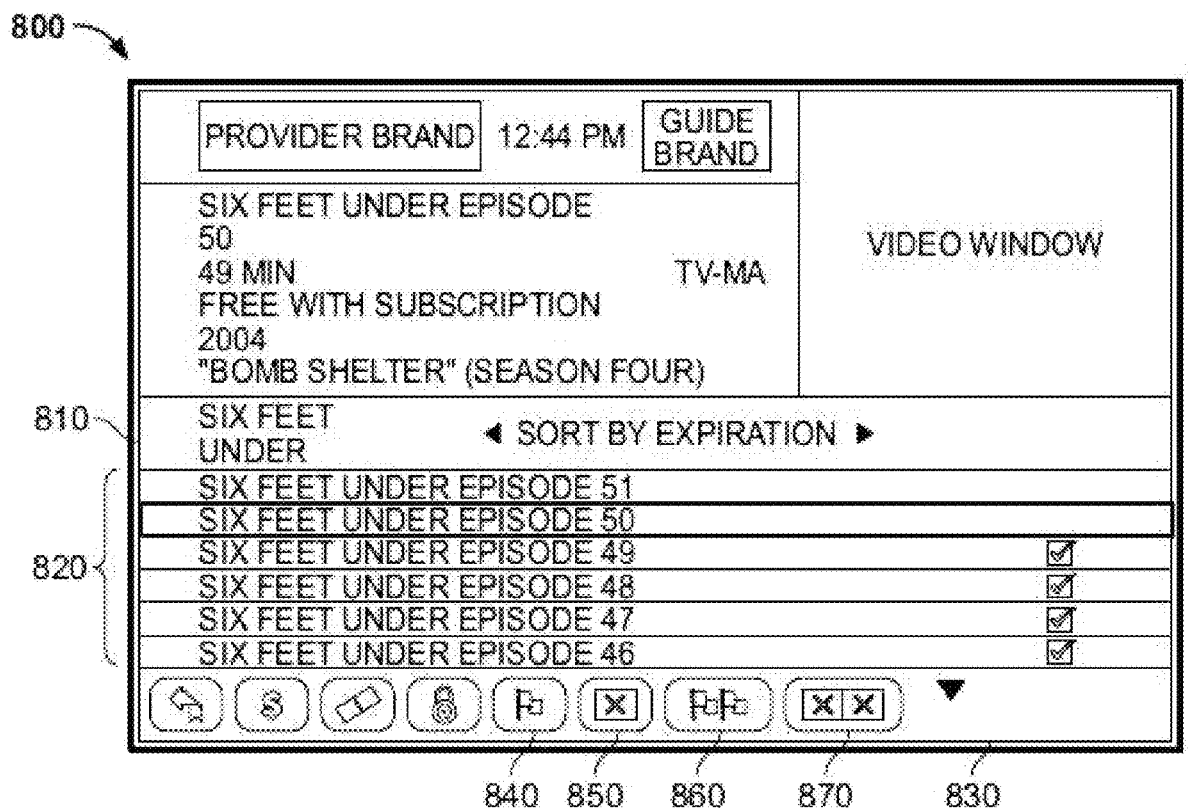
FIG. 8 is an illustrative display screen showing VOD program listings sorted based on how much longer each of the VOD programs will be available from the VOD server in accordance with one embodiment of the invention.

FIG. 8 shows another display screen 800 of a list of VOD programs that is sorted based on availability times. As shown in section 810, the viewer has selected to sort a particular television series based on how much longer each episode will be made available from remote VOD server 150. For example, episodes that will be removed the soonest are listed first while episodes that will be removed the latest are listed last. The list is displayed in section 820. Although not shown, section 820 can also include, alongside each episode title, any other suitable information including how long the episode has been made available or how much longer the episode will be made available.

Display screen 800 may also include a section 830 that includes buttons from which a viewer can select. The buttons, when selected, may allow the viewer to return to a main menu, to purchase a highlighted episode, to view a trailer of the highlighted episode, to parentally lock the highlighted episode or all episodes in the list, to mark the highlighted episode as "of interest" (button 840), to mark the highlighted episode as of "no interest" (button 860), to mark all episodes in the list as "of interest" (button 860), to mark all episodes in the list as of "no interest" (button 870), or any other suitable action. Buttons 860 or 870, when selected, may mark all previously unmarked episodes, may prompt the viewer for which mark to use for each previously marked episode, may overwrite all previously marked episodes, or may perform any other suitable action.

In yet another embodiment of the invention, after a viewer has played back a VOD program, a list of related VOD programs may be automatically generated and displayed to the viewer. For example, a television series may have each episode as a separate VOD program. Also, a movie and its sequel(s) and/or prequel(s) may be separate VOD programs. The list of related VOD programs, which may include the already viewed program, may be listed in episode or movie order, in alphabetical order, based on the marks, based on availability times, or any other suitable order or combination thereof. The viewer may scroll through the list, view additional information about a particular program, request the playback of a particular program, mark a particular program as "of interest" or of "no interest," mark all programs in the list as "of interest" or of "no interest," return to a main menu, or perform any other suitable action.

Figure 9:
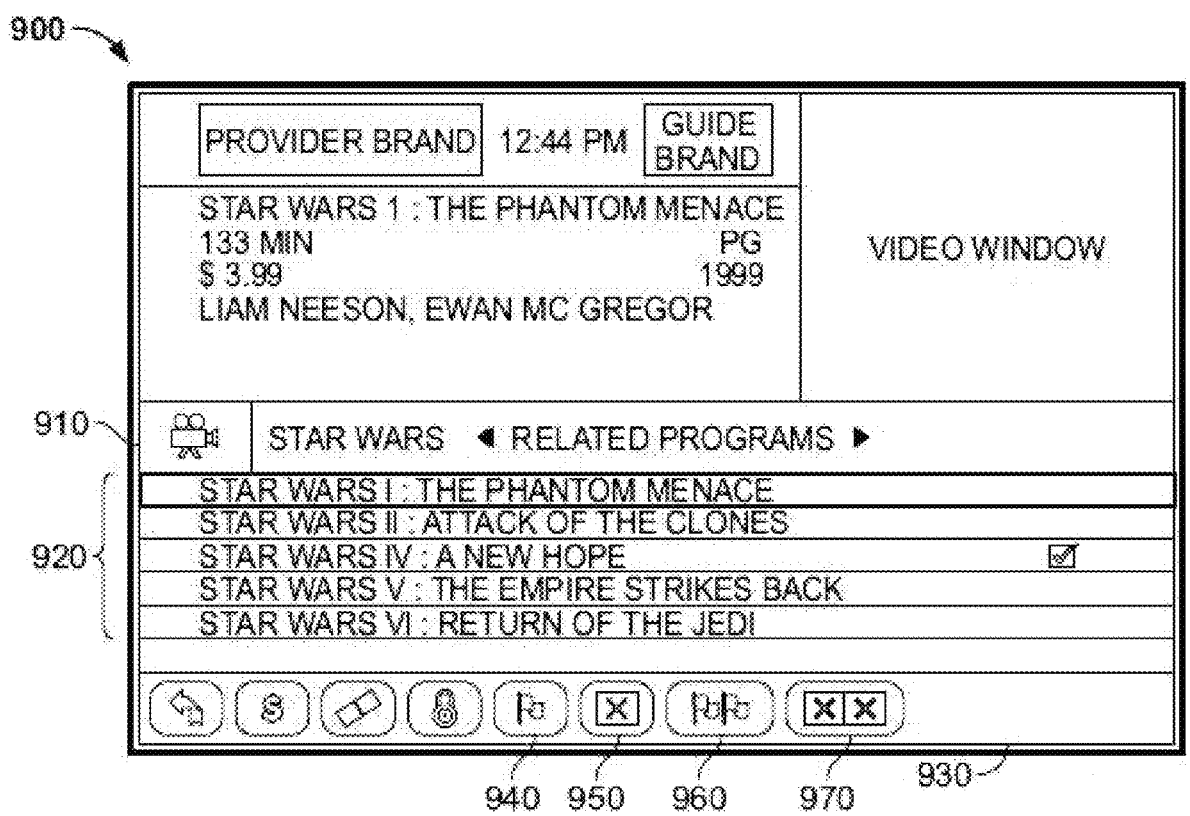
FIG. 9 is an illustrative display screen showing related VOD program listings in accordance with one embodiment of the invention.

FIG. 9 shows a display screen 900 of a list of related VOD programs. As an illustration, display screen 900 may be automatically presented to the viewer upon completion of the viewing of Star Wars IV: A New Hope. Screen 900 includes a section 910 that indicates that the list includes VOD programs related to Star Wars. From this section, the viewer may be allowed to scroll through selections to view other lists of VOD programs as described in connection with FIGS. 4-8. The list of related Star Wars programs is displayed in section 920, which include the already viewed program (Star Wars IV), the prequels (Star Wars I and II), and the sequels (Star Wars V and VI). Although the programs are listed in episode order, the programs may be listed in any other suitable order.

Display screen 900 may also include a section 930 that includes buttons from which a viewer can select. The buttons, when selected, may allow the viewer to return to a main menu, to purchase a highlighted movie, to view a trailer of the highlighted xo movie, to parentally lock the highlighted movie or all movies in the list, to mark the highlighted movie as "of interest" (button 940), to mark the highlighted movie as of "no interest" (button 950), to mark all movies in the list as "of interest" (button 960), to mark all movies in the list as of "no interest" (button 970), or any other suitable action.

Buttons 960 or 970, when selected, may mark all previously unmarked movies, may prompt the viewer for which mark to use for each previously marked movie, may overwrite all previously marked movies, or may perform any other suitable action.

For clarity, the button for marking all VOD programs in a list as "of interest" (buttons 860 and 960) and the other button for marking all VOD as programs in the list as of "no interest" (buttons 870 and 970) are described in connection with FIGS. 8 and 9 for clarity. However, these buttons may be provided to the viewer in response to any suitable list of VOD programs generated based on viewer selections.

Figure 10:
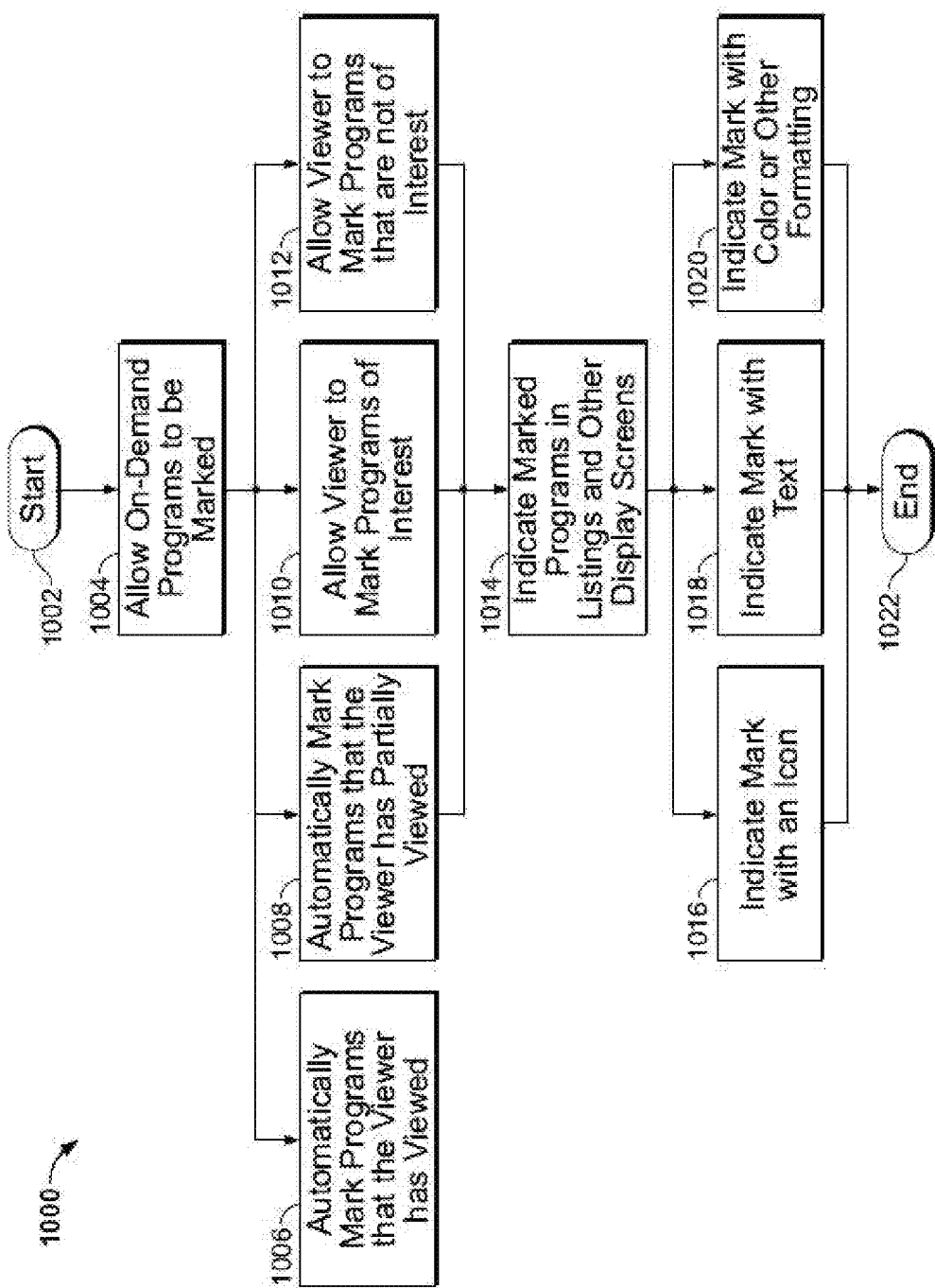
FIG. 10 is a flow diagram illustrating the marking of VOD programs in accordance with one embodiment of the invention.

FIGS. 10-13 are flow diagrams illustrating different embodiments of the invention. FIG. 10 illustrates a process 1000 for marking VOD programs. Process 1000 begins at step 1002. At step 1004, process 1000 allows VOD programs to be marked in one of four ways at steps 1006, 1008, 1010, 1012. At step 1006, processing circuitry 132 automatically marks programs that have already been viewed with a first mark (e.g., mark 640). At step 1008, processing circuitry 132 automatically marks programs that have been partially viewed with a second mark (e.g., mark 530). At step 1010, a viewer may mark programs of interest with a third mark (e.g., mark 430) using user input device 120 similar to that described in connection with FIG. 2A. At step 1012, a viewer may mark programs not of interest with a fourth mark (e.g., mark 650) using user input device 120 similar to that described in connection with FIGS. 2B and 3.

Additional marks, fewer marks, or a different combination of marks may be used. After steps 1006, 1008, 1010, or 1012, process 1000 moves to step 1014 where processing circuitry 132 may indicate the marked programs in listings or other screens on display device 140. For example, in FIGS. 4-9, a check mark symbol (mark 640) may be used to represent an "already viewed" program, a half-shaded box symbol (mark 530) may be used to represent a "partially viewed" program, an "X" symbol (mark 650) may be used to represent a program of "no interest," and a flag symbol (mark 430) may be used to represent a program "of interest." The mark may be represented by an icon at step 1016, with text at step 1018, or with color or other formatting at step 1020. Process 1000 then ends at step 1022.

Figure 11:
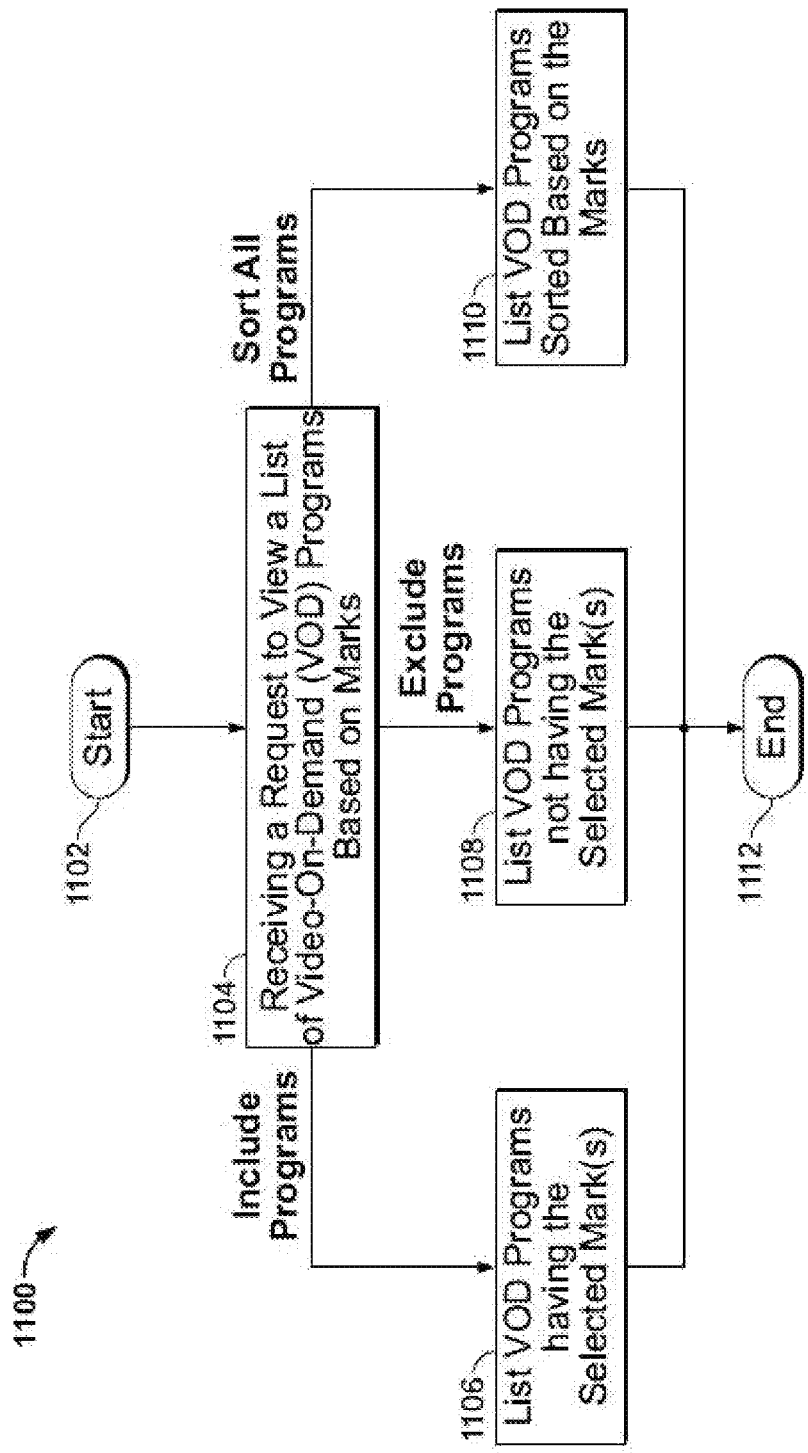
FIG. 11 is a flow diagram illustrating the displaying of VOD program listings based on mark in accordance with one embodiment of the invention.

FIG. 11 illustrates a process 1100 for displaying a list of VOD programs. Process 1100 starts at step 1102. At step 1104, processing circuitry 132 receives a request to view a list of VOD programs based on marks via user input device 120. The request can include the categories of VOD programs to display, the types of marks to include or exclude, the order in which to display the programs, and any other suitable information. The categories of VOD programs to display can include, for example all programs, movies, television shows, or any other suitable category or combination of categories. The types of marks to include or exclude can include "already viewed" marks, "partially viewed" marks, "of interest" marks. "no interest" marks, no marks, or any other suitable marks or combinations of marks. The order in which to display the programs can include, for example, programs marked as "of interest," followed by programs marked as "partially viewed," followed by unmarked programs, followed by programs marked as "already viewed," and followed by programs marked as of "no interest" (e.g., FIGS. 6A-B). The programs can also be displayed in any other suitable order that includes or excludes particular marks.

If the request is to include programs having a certain mark(s), process 1100 moves to step 1106 where processing circuitry 132 generates as output a list of programs having the selected mark(s) for as display on display device 140. For example, as shown and described in connection with FIG. 4, all movies marked as "of interest" are displayed. If the request to exclude programs having a certain mark(s), process 1100 moves to step 1108 where processing circuitry 132 generates as output a list of programs not having the selected mark(s) for display on display device 140. For example, as shown and described in connection with FIG. 5, movies marked as of "no interest" or "already viewed" are not displayed. If the request is to sort programs based on marks, process 1100 moves to step 1110 where processing circuitry 132 generates as output such a sorted list for display on display device 140. For example, as shown and described in connection with FIGS. 6A-B, all movies are sorted alphabetically by mark. Movies marked as "of interest" are listed first, followed by movies marked as "partially viewed," followed by unmarked movies, followed by movies marked as "already viewed," and followed by movies marked as of "no interest." If desired, a combination of steps 1106, 1108, and 1110 may be performed. After steps 1106, 1108, or 1110, process 1100 ends at step 1112.

Figure 12:
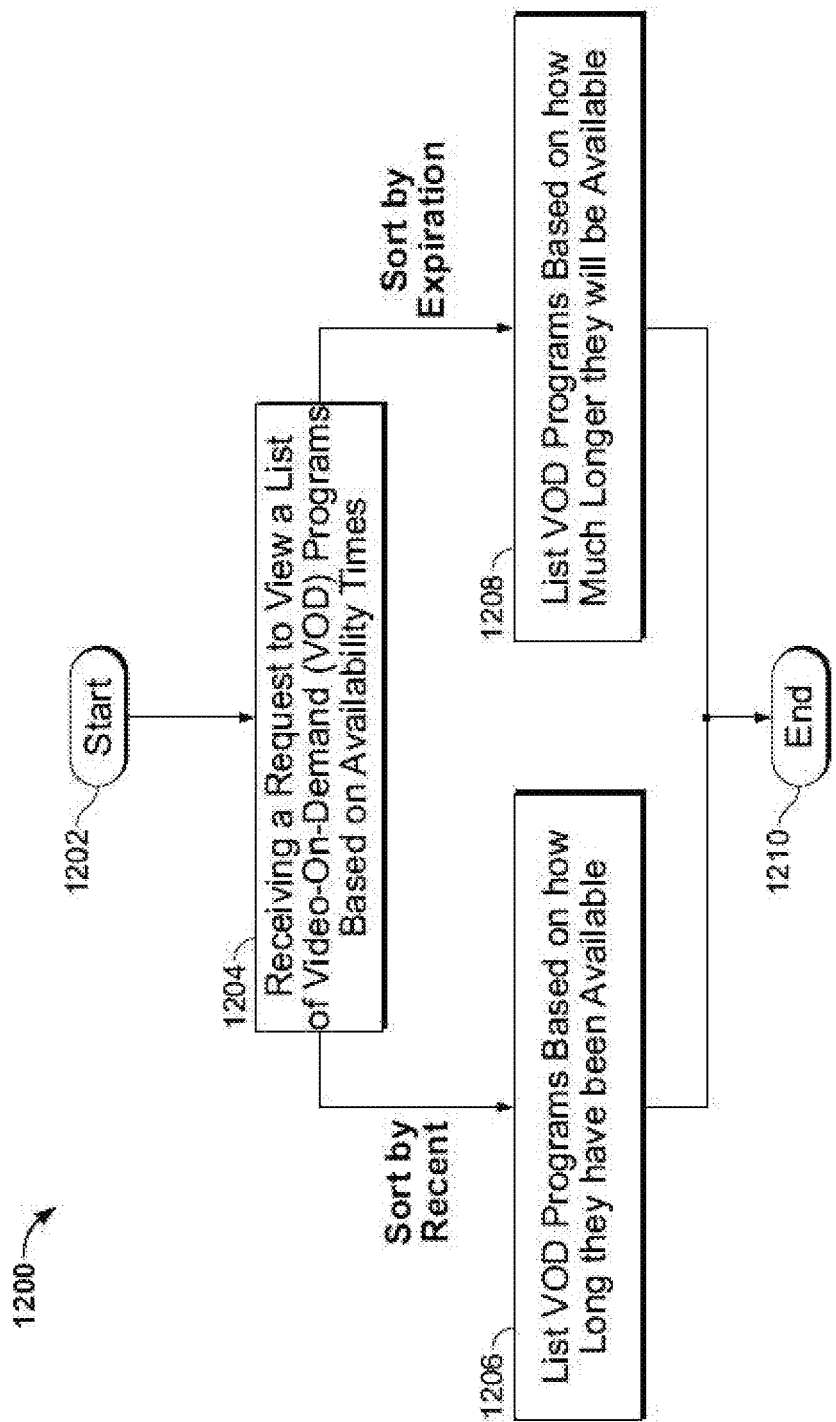
FIG. 12 is a flow diagram illustrating the displaying of VOD program listings based on availability times in accordance with one embodiment of the invention.

FIG. 12 illustrates another process 1200 for displaying a list of VOD programs. Process 1200 begins at step 1202. At step 1204, processing circuitry 132 receives a request to view a list of VOD programs based on availability times via user input device 120. The request can include the categories of VOD programs to display, the order in which to display the programs, and any other suitable information. The categories of VOD programs to display can include, for example all programs, movies, television shows, or any other as suitable category or combination of categories. The order in which to display the program can be based on the amount of time that each program has been available from remote video server 150, how much longer each program will be made available from remote video server 150, or any other suitable order.

If the request is to sort programs based on how recently each program has been made available from remote VOD server 150, process 1200 moves to step 1206 where processing circuitry 132 generates as output the sorted list for display on display device 140. For example, as shown and described in connection with FIG. 7, movies that have been made available from remote VOD server 150 most recently are listed first while movies that have been made available from remote VOD server 150 the longest are listed last. If the request is to sort programs by how much longer each program will be made available from remote VOD server 150 (e.g., by expiration time), process 1200 moves to step 1208 where processing circuitry 132 generates as output the sorted list for display on display device 140. For example, as shown and described in connection with FIG. 8, television episodes that will be removed from remote VOD server 150 the soonest will be listed first while television episodes that will be removed from remote VOD server 150 the latest will be listed last. After steps 1206 or 1208, process 1200 ends at step 1210.

Figure 13:
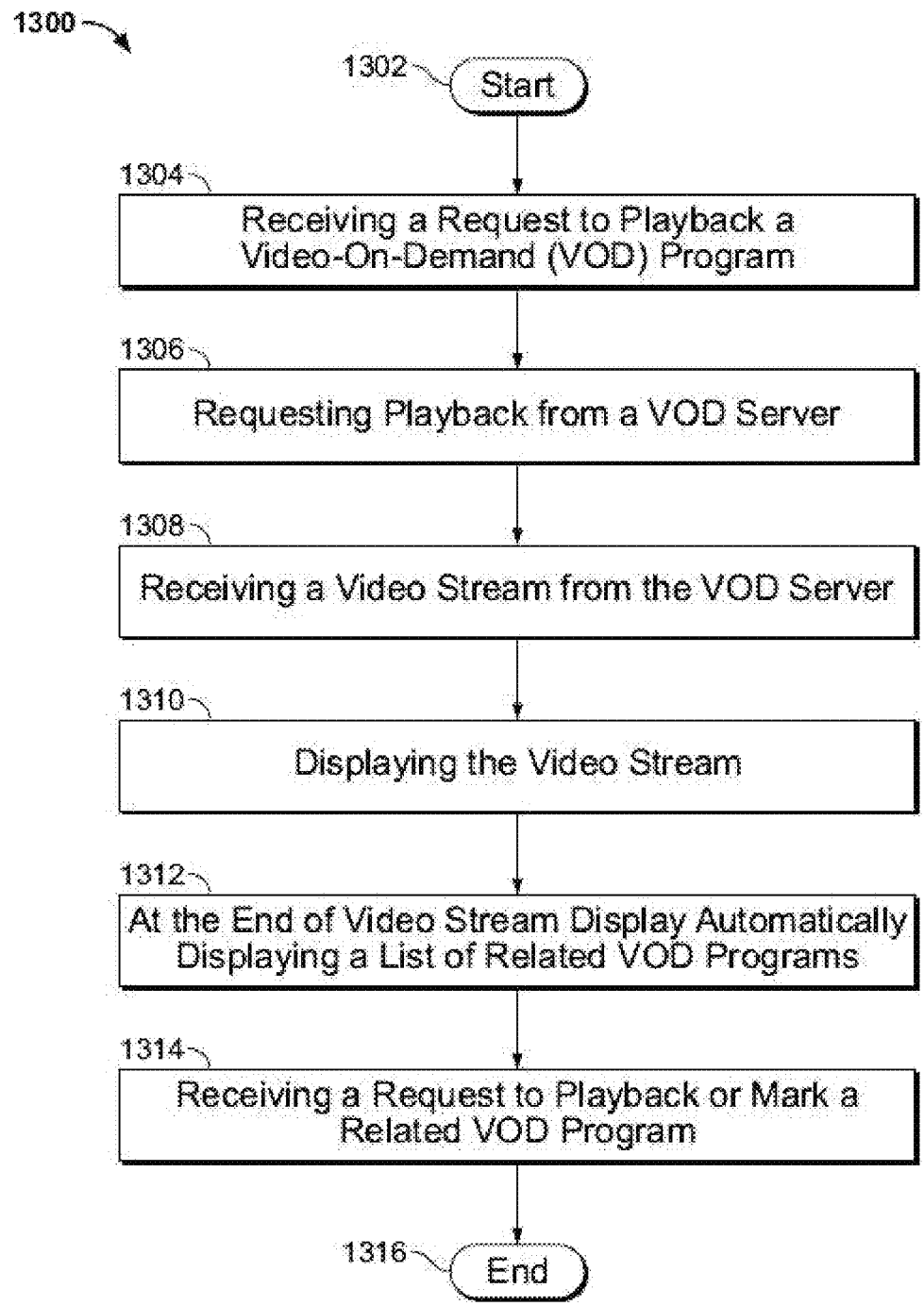
FIG. 13 is a flow diagram illustrating the displaying of related VOD program listings in accordance with one embodiment of the invention.

FIG. 13 illustrates a process 1300 for displaying of a list of related VOD programs. Process 1300 begins at step 1302. At step 1304, processing circuitry 132 receives a request to play back a VOD program via user input device 120. At step 1306, processing circuitry 132 requests playback of the program from remote VOD server 150. At step 1308, processing circuitry 132 receives a video stream of the program from remote video server 150. Processing circuitry 132 sends as output the video stream for display on display device 140 at step 1310. Alternatively, although not shown, processing circuitry 132 may also store the video stream in storage device 134 for immediate or later playback. At step 1312, at the end of the video stream display, processing circuitry 132 automatically generates a list of related VOD programs for output on display device 140. For example, as shown and described in connection with FIG. 9, upon completion of the playback of the movie Star Wars IV: A New Hope, a list of related programs (e.g., screen 900) is generated, and displayed on display device 140. At step 1314, processing circuitry 132 can receive a request to play back one of the related programs or to mark one or more of the related programs via user input device 120. Process 1300 ends at step 1316.

Thus it is seen that an improved VOD system provides for a list of VOD programs based on viewer selections. One skilled in the art will appreciate that the invention can be practiced by other than the described embodiments, which are presented for purposes of illustration and not of limitation, and the present invention is limited only by the claims which follow.

What is claimed is:

1. A method comprising:
   detecting partial playback of a plurality of video-on-demand programs, wherein partial playback is detected when at least a portion of a video-on-demand program, from the plurality of video-on-demand programs, has been viewed;
   in response to detecting the partial playback of the plurality of video-on-demand programs, storing in one or more memories data indicating that the plurality of video-on-demand programs were partially played,
   receiving a selection to view a list of video-on-demand programs; and
   in response to receiving the selection to view the list of video-on-demand programs:
      reading the data from the one or more memories; and
      generating for simultaneous display a grouped list of identifiers of the plurality of partially played video-on-demand programs with respective marks indicating that the plurality of video-on-demand programs were partially played.

2. The method of claim 1, wherein the generating for simultaneous display the grouped list of identifiers and the respective marks comprises arranging the identifiers and marks in a two dimensional array with the identifiers adjacent to the corresponding marks.

3. The method of claim 1, wherein the plurality of partially played video-on-demand programs comprise a plurality of episodes of a single series.

4. The method of claim 1, further comprising generating for display a list of identifiers of additional video-on-demand programs distinct from the partially played video-on-demand programs, wherein the marks are displayed in a color distinguishing the partially played video-on-demand programs from the additional video-on-demand programs.

5. The method of claim 4, wherein the marks comprise at least one of a textual mark or a graphical mark.

6. The method of claim 1, wherein the marks comprise a partially shaded symbol.

7. The method of claim 6, wherein the partially shaded symbol is rectangular.

8. The method of claim 1, further comprising:
generating for simultaneous display options to mark one or more of the displayed identifiers of the partially completed video-on-demand programs as of interest or not of interest.

9. The method of claim 8, further comprising sorting the list of partially completed video-on-demand programs such that partially completed video-on-demand programs marked as of interest are presented more prominently than other partially completed video-on-demand programs from the list.

10. The method of claim 1, further comprising:
generating for display a selectable sorting option for sorting the list of the partially completed video-on-demand programs, wherein the sorting option is selectable from a group comprising two or more of: a) programs of interest, b) partially completed video-on-demand programs, c) alphabetical order, d) time remaining before program expiration, and e) time of program availability.

11. A system comprising:
one or more memories for storing instructions; and
control circuitry configured to execute the instructions to:
detect partial playback of a plurality of video-on-demand programs, wherein partial playback is detected when at least a portion of a video-on-demand program, from the plurality of video-on-demand programs, has been viewed;
in response to detecting the partial playback of the plurality of video-on-demand programs:
store data indicating that the plurality of video-on-demand programs were partially played;
receive a selection to view a list of video-on-demand programs; and
in response to receiving the selection to view the list of video-on-demand programs:
read the stored data, and
generate for simultaneous display a grouped list of identifiers of the plurality of partially played video-on-demand programs along with respective marks indicating that the plurality of video-on-demand programs were partially played.

12. The system of claim 11, wherein the generating for simultaneous display the grouped list of identifiers and the respective marks comprises arranging the identifiers and marks in a two dimensional array with the identifiers adjacent to the corresponding marks.

13. The system of claim 11, wherein the plurality of partially played video-on-demand programs comprise a plurality of episodes of a single series.

14. The system of claim 11, wherein the control circuitry is further configured to generate for display a list of identifiers of additional video-on-demand programs distinct from the partially played video-on-demand programs, wherein the marks are displayed in a color distinguishing the partially played video-on-demand programs from the additional video-on-demand programs.

15. The system of claim 11, wherein the marks comprise at least one of a textual mark or a graphical mark.

16. The system of claim 11, wherein the marks comprise a partially shaded symbol.

17. The system of claim 16, wherein the partially shaded symbol is rectangular.

18. The system of claim 11, wherein the control circuitry is further configured to:
generate for simultaneous display options to mark one or more of the displayed identifiers of the partially completed video-on-demand programs as of interest or not of interest.

19. The system of claim 18, wherein the control circuitry is further configured to sort the list of partially completed video-on-demand programs such that partially completed video-on-demand programs marked as of interest are presented more prominently than other partially completed video-on-demand programs from the list.

20. The system of claim 11, wherein the control circuitry is further configured to:
generate for display a selectable sorting option for sorting the list of the partially completed video-on-demand programs, wherein the sorting option is selectable from a group comprising two or more of: a) programs of interest, b) partially completed video-on-demand programs, c) alphabetical order, d) time remaining before program expiration, and e) time of program availability.

* * * * *